C. KUNKLER.
COMBINATION SALT AND PEPPER SHAKER.
APPLICATION FILED FEB. 27, 1917.
1,248,345. Patented Nov. 27, 1917.
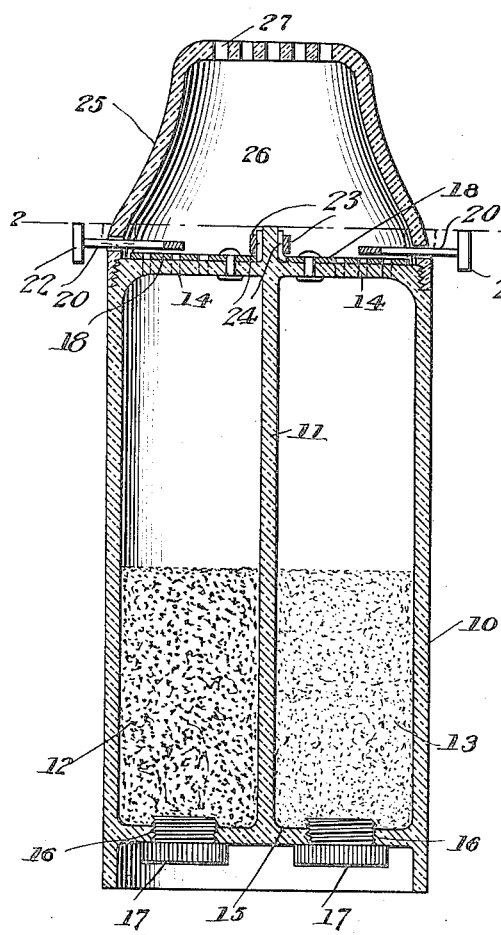
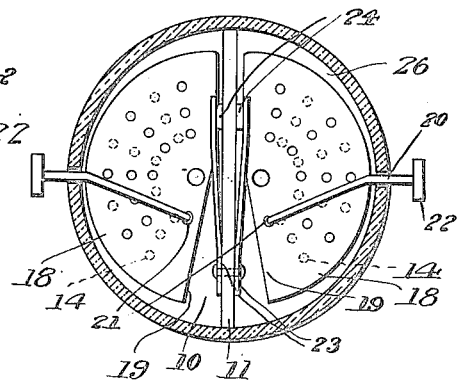
INVENTOR
Clarence Kunkler.
BY Victor J. Evans
ATTORNEY
WITNESSES

UNITED STATES PATENT OFFICE.

CLARENCE KUNKLER, OF COLUMBUS, OHIO.

COMBINATION SALT AND PEPPER SHAKER.

1,248,345.   Specification of Letters Patent.   Patented Nov. 27, 1917.

Application filed February 27, 1917. Serial No. 151,331.

*To all whom it may concern:*

Be it known that I, CLARENCE KUNKLER, a citizen of the United States, residing at Columbus, in the county of Franklin and State of Ohio, have invented new and useful Improvements in Combination Salt and Pepper Shakers, of which the following is a specification.

This invention comprehends the provision of a combination salt and pepper shaker embodying a mixing chamber common to both the salt and pepper compartments respectively, so that both substances can be properly mixed prior to being sprinkled from the shaker entirely.

In carrying out the invention I provide means for controlling the passage of salt and pepper from their respective compartments, including thumb actuated elements, whereby either salt, pepper or both may be sprinkled from the shaker as desired.

The nature and advantages of the invention will be better understood from the following detail description when taken in connection with the accompanying drawing, the invention residing in the construction, combination and arrangement of parts as claimed.

In the drawing forming part of this specification like numerals of reference indicate similar parts in the several views and wherein:—

Figure 1 is a vertical sectional view through the condiment holder.

Fig. 2 is a horizontal sectional view taken on line 2—2 of Fig. 1.

Before entering into a detail description of what is herein shown, I desire to have it understood that the disclosure is merely illustrative of the preferred embodiment of the invention, to which I do not limit myself, and that various changes in the design, construction and arrangement of parts may be resorted to when desired as fall within the scope of what is claimed.

As shown in this specific instance the combined salt and pepper shaker comprises a single receptacle indicated at 10 which may be constructed from any suitable material and proportion without departing from the spirit of the invention. The receptacle is divided by a vertical partition 11 into a salt receiving compartment 12 and a pepper receiving compartment 13, the top of the receptacle being preferably made integral to the body portion and perforated as at 14 to permit of a discharge of the contents from either compartment. The bottom 15 is provided with spaced openings 16 preferably threaded, there being one opening for each compartment to provide means for filling the latter when desired, a threaded plug or the like 17 being employed for each opening constituting a closure therefor. It will be noted that the bottom 15 is disposed an appreciable distance above the lower edge of the body 10, to permit the article to be properly seated upon a table or other support, during which time the plugs 17 are wholly concealed from view.

The partition 11 projects an appreciable distance above the perforated top of the receptacle, and pivoted upon said top at each side of the partition 11 is a semi-disk-like apertured plate 18 which controls the passage of the contents of its particular compartment when the shaker is being used. As shown in Fig. 2, each plate 18 is cut on an angle along its straight edge as at 19 to permit of the pivotal movement of the plate, and such movement is imparted to the latter through the instrumentality of an arm 20 having one extremity suitably secured to the plate at a point adjacent its cut away portion such as at 21, the arm being mounted for sliding movement and has its projected extremity provided with a thumb engaged button 22. Secured to the opposite sides of the partition 11 are leaf springs 23, there being one spring for each of the pivoted plates 18. Each spring is secured at one end to the partition 11 while its opposite ends bears against a lug 24 rising from its respective plate with a view of normally maintaining the plate in a position whereby the perforations thereof will be disposed out of registration with the perforations 14 of the top of the shaker. Manifestly by reason of the construction and arrangement of parts, either one of the plates 18, or both may be moved about its pivot to bring the perforations of the plates in full registration with the perforations 14, or partly so to control the passage of the contents from the respective compartments 12 and 13 when use of the shaker is desired. This independent or simultaneous adjustment of the plates 18 is accomplished by pressing inwardly upon either one or both of the arms 20. When pressure is removed from the arm or arms 20 the spring or springs 23 function to automatically return the parts to their normal position hereinabove stated.

A perforated cap 25 is threaded upon, or otherwise removably secured to the body 10 of the shaker at a point adjacent the top thereof, and the space confined within the cap defines a mixing chamber 26 which receives the salt and pepper from their respective compartments, prior to the discharge of these substances from the shaker entirely, whereby the salt and pepper can be thoroughly mixed before being sprinkled from the compartment 26 through the perforations 27 in the usual well known manner. While it is herein shown that the salt and pepper compartments respectively are embodied in a single receptacle, two separate or independent receptacles properly united may be employed in combination with a mixing chamber common to both.

What is claimed is:—

1. A combination salt and pepper shaker embodying a receptacle, a partion dividing the latter into individual compartments, a perforated top for each compartment, said partition projecting above and between said top, leaf springs secured to the opposite sides of said partition and a perforated plate pivoted upon each top for controlling the discharge of the contents from the compartments, said springs being connected with said plates and normally holding the perforations of the latter out of registry with the perforations of said tops, a perforated cap secured to the receptacle and defining a mixing chamber common to both of said compartments, and an actuating element for each plate operating through an opening in said cap as described.

2. A combination salt and pepper shaker embodying a receptacle, a partition dividing the latter into individual compartments, a perforated top for each compartment, said partition projecting above and between said tops, a perforated cap associated with the shaker and defining a mixing chamber common to both compartments, means arranged within the mixing chamber for controlling the discharge of the contents from the respective compartments, and yieldable means secured to the projecting extremity of said partition for maintaining the last mentioned means in a position to close the perforations in said tops.

In testimony whereof I affix my signature.

CLARENCE KUNKLER.